United States Patent Office 3,021,276
Patented Feb. 13, 1962

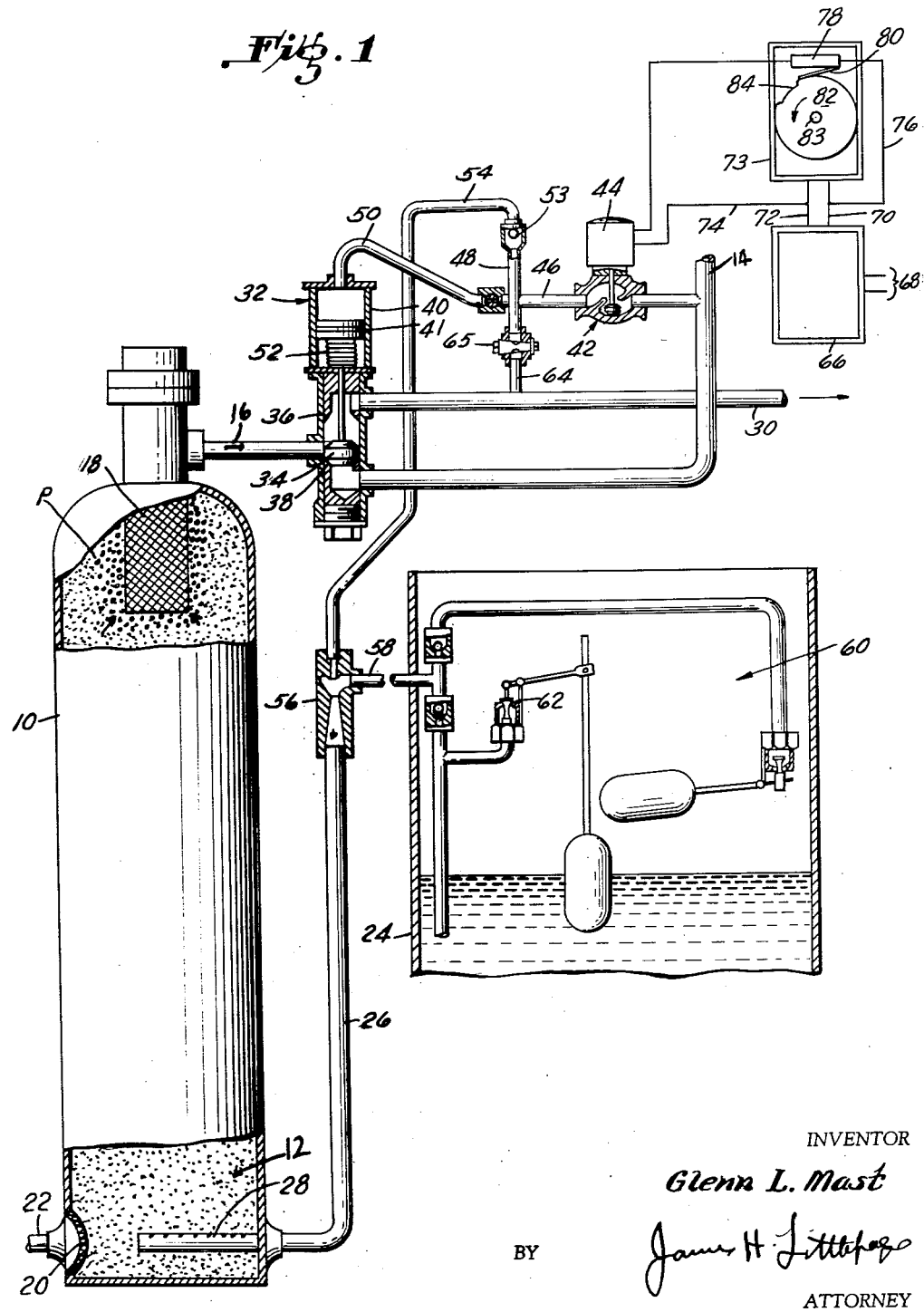

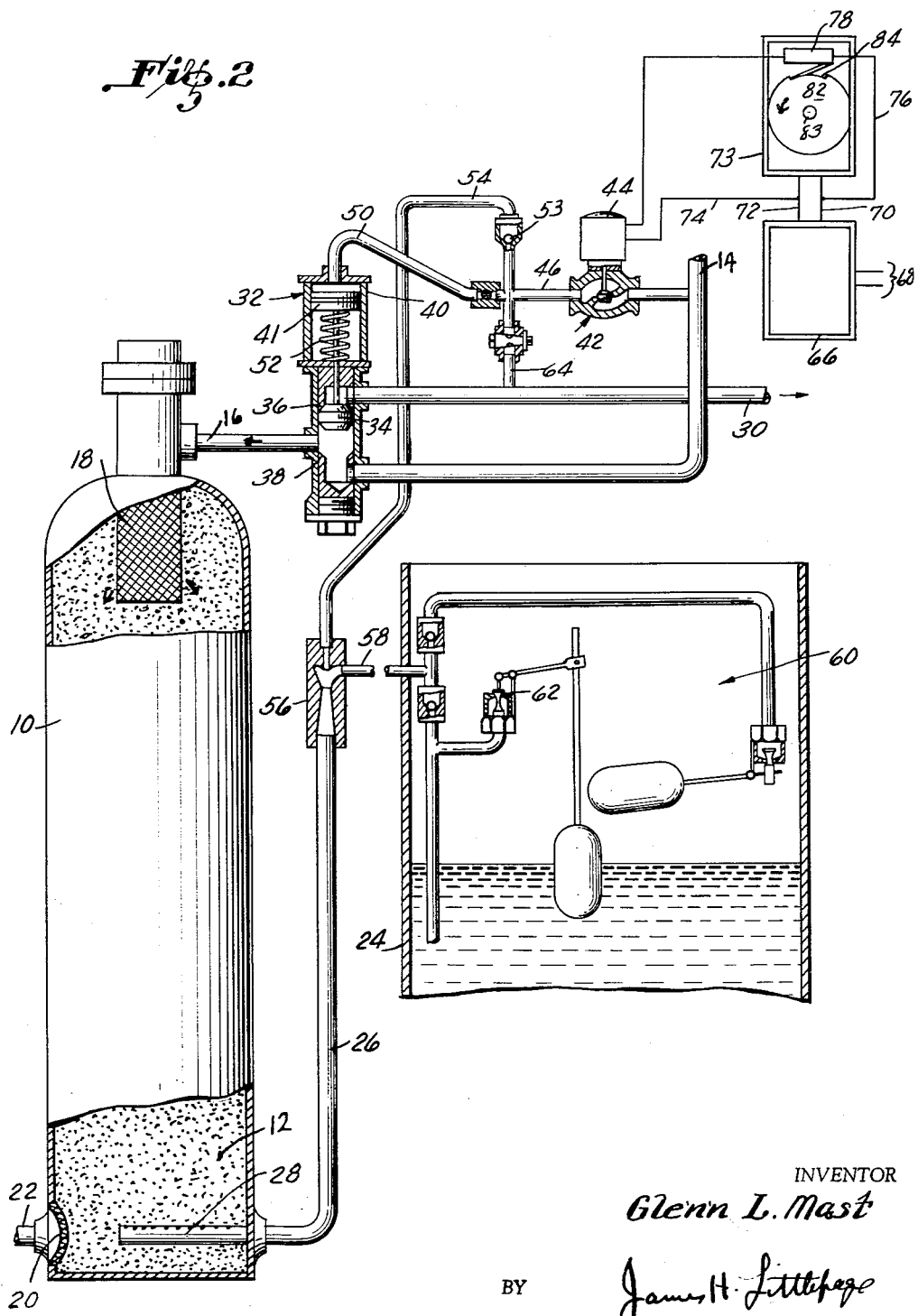

3,021,276
METHOD AND APPARATUS FOR REVERSE FLOW WATER SOFTENER REGENERATION
Glenn L. Mast, 3145 N. 124th St., Milwaukee, Wis.
Filed Dec. 4, 1959, Ser. No. 857,411
11 Claims. (Cl. 210—35)

This invention relates to water softeners and filters and, more particularly, to upflow regenerative softeners wherein, during regeneration, a brine solution is passed upwardly through a body of zeolite, and water or a mixture of water and air is next passed upwardly through the bed to rinse away the brine.

The primary object of the invention is to prevent what is known in the art as "bee hiving" at the top of the zeolite bed of air upflow regenerative water softener. Heretofore, it has been found that during upflow regeneration, iron and particles of foreign matter collect at the top screen, thereby inhibiting the flow of brine through the bed, and also deterring the flow of rinse water. Bee hiving may prevent the complete regeneration of the zeolite bed and, also, prevent the complete rinsing of the brine from the bed. One of the most deleterious effects, however, is that the mineral and other foreign matter particles first collected at the top screen act as a filter for subsequent particles so that the rate of bee hiving increases as regeneration and rinsing continues. When the rinsing cycle terminates and the normal downflow of water through the bed resumes, the particles collected beneath the top screen fall back into the bed.

The object now is to dissipate the incipient bee hive periodically for brief intervals during the regenerating and rinsing cycles of a water softener so that it never has a chance to build up to any appreciable extent. More specifically, it is intended to reverse the flow through the zeolite bed periodically during the normally upflow brining and rinsing cycles so that fresh water momentarily flows downwardly through the bed, thereby washing the collected particles away from the top screen and the top of the bed, thereby giving the smaller particles a chance to filter through the top screen.

These and other objects will be apparent from the following specification and drawings, in which:

FIG. 1 is a side elevation with portions broken away of a typical down-flow water softener operating during its up-flow regenerating cycle, illustrating the formation of a bee hive around the top screen of the water softener tank; and, FIG. 2 is a view similar to FIG. 1, but illustrating the brief interval operation of the anti-bee hive device.

In the ensuing specification, the application of the invention to a typical up-flowing regenerative water softener such as disclosed in the patent to Mueller 2,698,292 will be described, it being understood that the invention is applicable to other up-flow regeneration systems wherein the problem of bee hiving is present. In the chosen example, a water softener tank 10 contains a zeolite bed 12 for treating water from a supply line 14. The water, containing undesired minerals and particles of foreign matter, is fed through an inlet pipe 16 and through a top screen 18 into the upper portion of the bed, through which it filters downwardly and exits through a bottom screen 20 to a soft water service pipe 22. In order to regenerate the zeolite bed, brine derived from a tank 24 is fed through a pipe 26 to a perforate manifold 28 in the bottom of tank 10. The brine flows upwardly through bed 12 and out the top of the tank, passing through top screen 18 and inlet pipe 16 to a waste pipe 30. The connection of inlet pipe 16 either to hard water supply pipe 14 or waste pipe 30 is controlled by a switch valve 32 having a plunger alternatively closing against a valve seat 36 for closing off waste pipe 30 and a valve seat 38 for closing off hard water supply pipe 14. Plunger 34 is actuated by a control cylinder and piston 40, 41 which, in turn, is under the influence of a master control valve 42 actuated by a solenoid 44. Master control valve 42 is normally biased or held by conventional means, such as a spring, not detailed, to the position illustrated in FIG. 2 wherein it blocks the flow of water through a branch conduit 46 connected to hard water supply pipe 14. However, when solenoid 44 is energized so that master control valve 42 opens, water flows through branch conduit 46 to a manifold 48, from which part of the water is distributed through a pressure pipe 50 to control cylinder 40, thereby forcing plunger 34 from its FIG. 2 position to its FIG. 1 position and, of course, switching the connection of inlet pipe 16 from hard water supply pipe 14 to waste pipe 30. When master control valve 42 opens, water is also distributed by manifold 48 through an upwardly opening check valve 53 to an upflow water line 54 through which the water flows into the bottom of tank 10 via pipe 26 and an injector 56 so that brine from tank 24 is drawn into the upflow water stream. Brine tank 24 contains a float control valve system, denoted generally at 60, arranged so that after a predetermined amount of brine has been drawn into the upflow water stream, a vacuum breaker valve 62 is opened. In a system of this sort, the upflow regenerative and rinsing cycle usually occupies from about twenty minutes to ninety minutes, the cycle being controlled by a timer 66 which is set so as to energize solenoid 44 at predetermined times. When master control valve 42 is opened by the solenoid, water flowing through upflow supply pipe 54 first draws in sufficient brine from tank 24 so that as the brine solution flows upwardly through zeolite bed 12 the bed is regenerated and, thereafter, when vacuum breaker valve 62 opens, air alone is drawn into the stream of water which flows upwardly through the zeolite bed and rinses out the brine. When solenoid 44 is de-energized so that valve 42 returns to its normally closed position of FIG. 2, the supply of water to manifold 48 is cut off so that spring 52 switches plunger 34 back to its FIG. 1 position. A bleeder line 64 connected to manifold 48 through control valve 65 permits the water in the manifold and pressure pipe 50 to bleed back into waste pipe 30, and the system resumes its normal water softening cycle wherein hard water flows downwardly through tank 10. For a brief period following the resumption of the normal water softening cycle, water backs up from the bottom of the tank through pipe 26 and eductor pipe 58 into brine tank 24 until the liquid rises to the desired level, whereupon the float valve system 60 closes off the brine tank outlets of eductor pipe 58. It will be apparent from the diagrammatic showing of FIG. 1 that, if particles P of mineral and other undesirable foreign matter collect or bee hive around screen 18 during the upflow, egress of brine and rinse water will be deterred and, as soon as the system returns to its normal water softening operation, the particles will move back downwardly into bed 12. A substantial number of the particles are sufficiently small to pass outwardly through top screen 18 but, as soon as the bee hive starts to form around the screen, these small particles which should be eliminated never reach the screen because the bee hive blocks their egress. It is this phenomenon with which the invention is concerned.

Referring particularly to the upper righthand portions of FIGS. 1 and 2 the regenerating cycle timer clock 66 is supplied with house current from an electrical supply line 68. Timer 66 is of conventional design, it being understood by those skilled in the art that timer 66 runs continuously and that, for a period of from about twenty to ninety minutes out of the predetermined number of hours, timer 66 closes a switch so that current flows through timer output leads 70 and 72. The timer output leads are connected to a synchronous motor 73, and through leads 74 and 76 they are also connected to solenoid 44. Solenoid lead 76, however, is connected through a micro switch 78 having an arm 80 engaging the periphery of a rotary cam disk 82 on the shaft 83 of synchronous motor 73. In the specific example described herein, cam disk 82 rotates once approximately each thirty seconds, and is provided with a peripheral recess 84 which requires approximately three seconds to pass micro switch arm 80. During the approximately three second interval when switch arm 80 is in recess 84, micro switch 78 is open, and during the remaining approximately twenty-seven seconds of rotation of cam disk 82, micro switch 78 is closed, thereby completing the energizing circuit to solenoid 44.

In operation, with synchronous motor 73 rotating cam disk 82 once each thirty seconds during the period when the regeneration cycle timer output circit 70, 72 is energized, valve plunger 34 switches from its FIG. 1 to its FIG. 2 position for approximately three seconds during the interval while micro switch arm 80 drops into cam disk recess 84. The resultant momentary downward flow of water through top screen 13 is sufficient to disperse the incipient bee hive around the screen and permit the small particles of foreign matter to exit through the screen during the succeeding twenty-seven second intervals when the high side of cam disk 82 closes micro switch 78 so as to re-energize solenoid 44. The ratio of time, i.e., three second downflow to twenty-seven seconds upflow has been found to be effective for preventing bee hiving of foreign particles and fines in a typical domestic installation. However, under other conditions, a longer or shorter up-flow period may be utilized. The length of time for the up-flow period depends upon the length of time it takes for a bee hive of foreign particles and fines to start to form. Likewise, the down-flow period of the cycle may occupy from one to three seconds, depending on the characteristics of the raw water and the particular equipment with which the invention is utilized.

While the method and apparatus which the invention has been described in connection with a specific prior art system, it should be understood that it has application to any comparable system having means for reversing flow through a water softener or filter tank for regeneration and/or rinsing of the filter material in the tank, the scope of the invention being limited only by the following claims.

I claim:

1. The method of regenerating a water filtering bed which comprises: feeding a brine solution through the bed for a period of over-all duration sufficient to regenerate the bed and wash out particles of impurities; filtering the solution by passing the same in one general direction through reticular interstices as it leaves the bed; periodically interrupting the feed of solution through the bed for intervals brief with respect to said period; and passing a fresh stream of water into the bed through said interstices in a direction contra to the direction of the brine stream therethrough during said intervals so as to disperse incipient collections of the particles of impurities from adjacent the interstices.

2. The method of regenerating a water filtering bed which comprises: feeding a stream of brine solution in one direction through the bed for a period of over-all duration sufficient to regenerate the bed and wash out particles of impurities; subsequently feeding a stream of rinse water through the bed in the same direction as the brine stream for an additional period of duration sufficient to rinse the brine solution from the bed and wash out additional particles of impurities; filtering the brine and rinse water streams as they leave the bed by passing the same through reticular interstices; periodically interrupting the brine and rinse water feeds for intervals brief with respect to said period; and passing fresh water into said bed through said interstices in a general direction contra to the flow of brine solution and rinse water therethrough during said brief intervals so as to preclude substantial collection of said particles of impurities adjacent the interstices.

3. The method of operating a reverse-flow regenerating zeolite water softener which comprises: feeding a stream of initially raw water through the bed in one direction until the bed is at least partly exhausted and contaminated with particles of impurities by the raw water, and simultaneously filtering the raw water through reticulated interstices as it enters the bed; then stopping the feed of raw water through the bed; feeding a stream of brine solution through the bed in a direction contra to that of the raw water stream for a period of predetermined duration, and simultaneously filtering the brine stream through said interstices as it leaves the bed; interrupting the feed of brine solution for an interval brief in comparison with the period of brine feed; resuming said feed of raw water through said interstices and into the bed during said interval; repeat cycling the brine feed, interruptions and brief resumptions of raw water feed until the bed is regenerated and at least partly cleansed of said particles; then feeding rinse water through the bed until the brine solution is rinsed therefrom; and resuming the first-mentioned feed of initially raw water through the bed.

4. The method as claimed in claim 3, the period of feed of brine being of approximately twenty-seven seconds' duration, the interval of interruption of said brine feed being of approximately three seconds' duration.

5. The method of operating a reverse-flow regenerating zeolite water softener which comprises: feeding a stream of initially raw water through the bed in one direction until the bed is at least partly exhausted and contaminated with particles and simultaneously filtering the raw water through reticulated interstices as it enters the bed; stopping the feed of raw water through the bed; then feeding a stream of brine solution through the bed in a direction contra to that of the raw water stream for a period of predetermined duration and simultaneously filtering said solution through said interstices as it leaves the bed; interrupting the feed of brine solution for an interval brief in comparison with said period; resuming said feed of raw water through said interstices and into the bed during said interval; repeat cycling the brine feed, interruptions and resumptions of raw water feed until the bed is regenerated and at least partly cleansed of said particles; then feeding a stream of rinse water through the bed in the same direction as the brine stream and for another period of predetermined duration and simultaneously filtering the rinse water stream through said interstices as it leaves the bed; interrupting the feed of rinse water for an interval brief with respect to said other period; resuming said feed of raw water through said interstices and into the bed during the last-mentioned interval; repeat cycling the rinse water feed, interruptions and resumptions of raw water feed until the brine solution is rinsed from the bed and at least some of said particles remaining after regeneration have been washed from the bed, and resuming the first-mentioned feed of initially raw water through the bed.

6. The method claimed in claim 5, the periods of brine and rinse water feeds being approximately twenty-seven seconds' duration, the intervals of interruption being of approximately three seconds' duration.

7. In a water filter including a tank for a bed of water filtering granules, a source of fresh water, a reservoir for regenerating material, a fluid circulating system including conduits connected to opposite ends of said tank, a reticulated filter for one of said conduits, and valve means switchable between first and second conditions for respectively circulating fresh water through the filter and thence through the tank and for alternatively circulating a solution of said regenerative material through the tank in the opposite direction and thence through the filter, valve control means normally maintaining said valve means in said first condition, regeneration cycle control means for periodically producing an output signal for a period corresponding approximately to the time required for predetermined flow of the solution of regenerative material through the tank, said valve control means including means responsive to said output signal for switching said valve means from the first condition to the second condition, and means for interrupting said output signal intervals during said period which are comparatively brief with respect to said period whereby said valve is switched back from said second condition to the first condition during said intervals.

8. In a water filter including a tank for a bed of water filtering granules, a reticulated filter in the tank, a source of fresh water, a reservoir for regenerating material, a fluid circulating system including valve means switchable between first and second conditions for respectively circulating fresh water through the filter and thence through the tank in one direction and for alternatively circulating said solution through the tank in the opposite direction and thence through the filter, a normally de-energized solenoid normally maintaining said valve means in said first condition, a cycle control timer having input and output circuits, said input circuit being adapted for connection to an electric current source and said cycle control timer periodically connecting said input and output circuits for intervals of predetermined duration, a synchronous electric motor connected to the output circuit of said cycle control timer, a switch, a supply circuit connecting the output circuit of said cycle control timer to said solenoid through said switch, and means driven by said synchronous motor for cyclically closing and opening said switch.

9. The combination claimed in claim 8, the means driven by said synchronous motor for cyclically closing and opening said switch operating to open the switch for an interval comparatively short with respect to the closing thereof comprising a cam.

10. In a water filter including a tank having opposite ends, said tank being adapted to hold a bed of water filtering granules between said ends, a water pipe leading into one end of said tank and a reticulated filter therefor, a service outlet for the other end of said tank, a source of regenerating material, conduit means connecting said source of regenerating material with said other end of said tank, supply means for water to be treated, said water normally containing sediment as well as other undesirable impurities, a waste pipe, and a fluid control system connected to said supply means, said source, said waste pipe and said water pipe including valve means switchable between a first condition establishing a service fluid flow circuit from said source through said waste pipe and said reticulated filter into said one end of said tank and thence through the bed and out the service connection, and a second condition in which a regenerating fluid flow circuit is established including said source of regenerating material, thence through said conduit means into the other end of the tank, thence through the bed, thence through the reticulated filter and water pipe and thence out the waste pipe, the improvement which comprises valve control means including an energizing circuit for periodically switching said valve means from said first condition to said second condition for a period of over-all duration corresponding to the time required for said regenerating material to regenerate the bed and to wash said sediment therefrom through said reticulated filter and water pipe and thence out said waste pipe, and means actuated by said energizing circuit for switching said valve means back from said second condition to said first condition for a series of intervals spaced from one another throughout said period and of durations brief with respect to said period.

11. The combination claimed in claim 7, the last-named means comprising time-control means actuated by said output signal.

References Cited in the file of this patent
UNITED STATES PATENTS

| 400,185 | Bohm | Mar. 26, 1889 |
| 1,452,151 | Genter et al. | Apr. 17, 1923 |
| 2,240,171 | Brice et al | Apr. 29, 1941 |
| 2,698,292 | Mueller | Dec. 28, 1954 |
| 2,748,948 | Fricke et al. | June 5, 1956 |
| 2,905,325 | Johnson | Sept. 22, 1959 |

FOREIGN PATENTS

| 205,583 | Australia | Jan. 29, 1957 |